United States Patent [19]
Elson et al.

[11] Patent Number: 5,626,380
[45] Date of Patent: May 6, 1997

[54] STORAGE DEVICE FOR VEHICLE LUGGAGE COMPARTMENT

[75] Inventors: Gerald L. Elson, Rochester; Barbara A. Sanders, Troy; David G. Hlavaty, Northville, all of Mich.

[73] Assignee: General Motors Corporation, Detroit, Mich.

[21] Appl. No.: 522,717

[22] Filed: Sep. 1, 1995

[51] Int. Cl.⁶ .................................................. B62D 33/06
[52] U.S. Cl. ................................... 296/39.1; 296/37.1
[58] Field of Search ............................. 296/37.1, 37.2, 296/37.3, 39.1, 37.8, 37.14, 37.16

[56] References Cited

U.S. PATENT DOCUMENTS

| | | | |
|---|---|---|---|
| D. 312,604 | 12/1990 | Barnes et al. | D12/155 |
| 2,091,069 | 8/1937 | Girl | 296/37.1 X |
| 2,792,137 | 5/1957 | Solomon et al. | 296/37.2 X |
| 2,797,828 | 7/1957 | Fritsche | 296/37.1 X |
| 2,867,471 | 1/1959 | Coon, Jr. | 296/37.2 X |
| 3,365,084 | 1/1968 | Fernicola | 214/450 |
| 4,189,056 | 2/1980 | Majewski | 211/195 |
| 4,398,765 | 8/1983 | Ishikawa | 296/37.2 |
| 4,540,213 | 9/1985 | Herlitz et al. | 296/37.5 |
| 4,884,773 | 12/1989 | Geeves | 224/311 |
| 4,944,544 | 7/1990 | Dick | 296/37.1 |
| 5,025,964 | 6/1991 | Phirippidis | 224/42.42 |
| 5,054,668 | 10/1991 | Ricchiuti | 224/42.42 |
| 5,054,864 | 10/1991 | Cesena | 312/328 |
| 5,167,433 | 12/1992 | Ryan | 296/37.1 |
| 5,379,906 | 1/1995 | Levin et al. | 211/195 |

FOREIGN PATENT DOCUMENTS

WO9501891  6/1994  WIPO.

*Primary Examiner*—Joseph D. Pape
*Attorney, Agent, or Firm*—Charles E. Leahy

[57] ABSTRACT

The luggage storage box is mounted within the automobile luggage compartment by first and second laterally spaced apart slide tracks which are positioned respectively on opposite sides of a spare tire storage recess in the floor of the luggage compartment. The storage box includes a floor with an opening therein to allow access to the spare tire storage recess. An access panel is hingedly mounted to the box to normally close the opening in the floor panel and can be selectively raised to an open position to permit unobstructed access to the spare tire storage recess without requiring removal of the storage box from the vehicle luggage compartment.

1 Claim, 2 Drawing Sheets

STORAGE DEVICE FOR VEHICLE LUGGAGE COMPARTMENT

The invention relates to a storage device for a vehicle luggage compartment and more particularly, provides a storage box having a floor panel with an openable access panel portion to enable access to a spare tire stored beneath the box in a recess of the vehicle floor.

SUMMARY OF THE INVENTION

It is well known in automobiles to provide a luggage compartment which is accessible through a trunk lid hinged on the vehicle body.

When the trunk lid is open, luggage, groceries, or other articles may be readily placed into or removed from the luggage compartment.

It is also known in automobiles to provide a recess in the floor of the luggage compartment to store a spare tire. A spare tire cover fits over the recess to close the recess and conceal the spare tire.

Prior patents such as Girl U.S. Pat. No. 2,094,401 and Solomon U.S. Pat. No. 2,792,137 have disclosed the provision of a storage box mounted within the luggage compartment by slide tracks so that the box can be easily slid from a rearwardmost position accessible to the vehicle user, to a forwardmost position which occupies the least accessible forwardmost area of the luggage compartment. It is also known to provide a latch which will selectively lock the storage box in either the forward or rearward position.

SUMMARY OF THE INVENTION

It would be desirable to employ a sliding luggage storage box in a vehicle of the type having a spare tire stored in a recess in the floor of the luggage compartment. However, the presence of the box obstructs access to the spare tire and accordingly requires removal of the storage box and/or supporting slide tracks from the vehicle in order to access the spare tire.

According to the present invention, the luggage storage box is mounted within the automobile luggage compartment by first and second laterally spaced apart slide tracks which are positioned respectively on opposite sides of a spare tire storage recess in the floor of the luggage compartment. The storage box includes a floor with an opening therein to allow access to the spare tire storage recess. An access panel is hingedly mounted to the box to normally close the opening in the floor panel and can be selectively raised to an open position to permit unobstructed access to the spare tire storage recess without requiring removal of the storage box from the vehicle luggage compartment.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
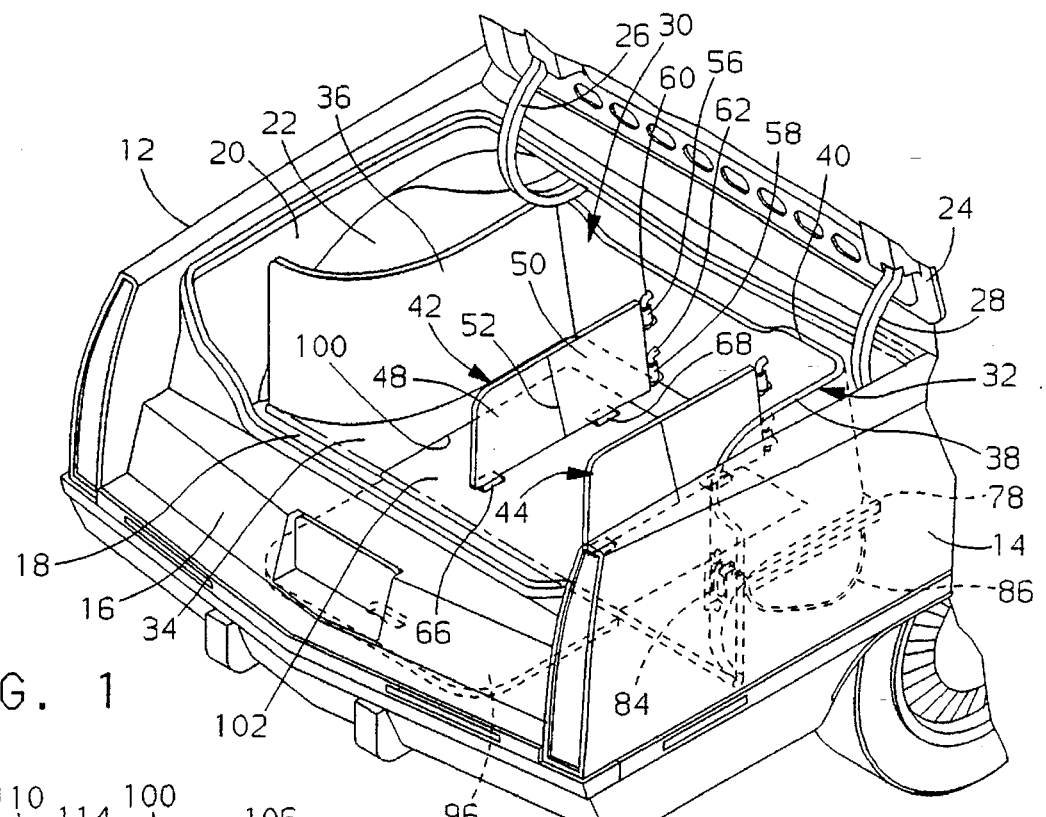
FIG. 1 is a perspective view of a vehicle luggage compartment having a storage device according to the invention.

Referring to FIG. 1, an automobile has a vehicle body including left quarter panel 12, right quarter panel 14, rear panel 16 and floor pan 18 which cooperate to form a luggage compartment 20. Left wheel housing 22 and right wheel housing, not shown, separate the luggage compartment 20 from the vehicle wheels. A trunk lid 24 is mounted by hinges 26 and 28 for movement between the open position of FIG. 1 and a closed position, not shown.

Figure 2:
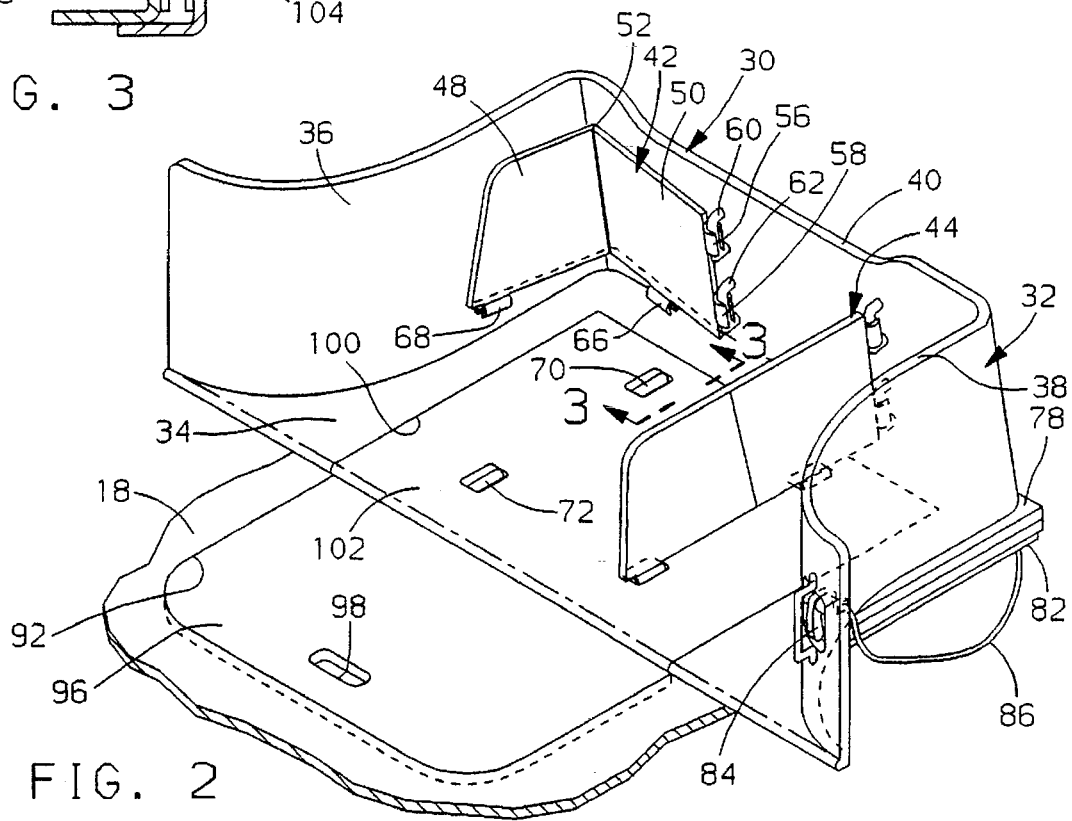
FIG. 2 is a fragmentary view of FIG. 1 showing the storage device positioned full forward in the luggage compartment.

As best seen in FIGS. 1 and 2, a storage box device generally indicated at 30 is mounted within the trunk. The storage device is a tray or box 32, preferably constructed of molded plastic, and includes a floor panel 34, side walls 36 and 38 and a forward wall 40. The side walls 36 and 38 are flared to fit closely around the wheel housings.

A pair of luggage dividers 42 and 44 are mounted on the luggage storage box 30. The divider 42, preferably molded plastic, includes panel portions 48 and 50 connected together by living hinge 52. Snap-On hinge brackets 56 and 58 are integrally molded to the panel portion 50 and snap fit onto hinge pins 60 and 62 integrally molded into the forward wall 40 of the storage box 30. Similar hinge brackets 66 and 68 project downwardly from the underside of panel portions 48 and 50 to snap fit onto hinge pins 70 and 72 provided in the floor of the storage box as seen in FIG. 2. The divider 44 is constructed identical to the divider 42. As seen in FIG. 2, the dividers can be selectively attached, detached or hingedly folded as desired to either a deployed position which divides the storage box into storage compartments or a stored position in which the divider is folded flat against the side wall and forward wall of the storage box.

Figure 5:
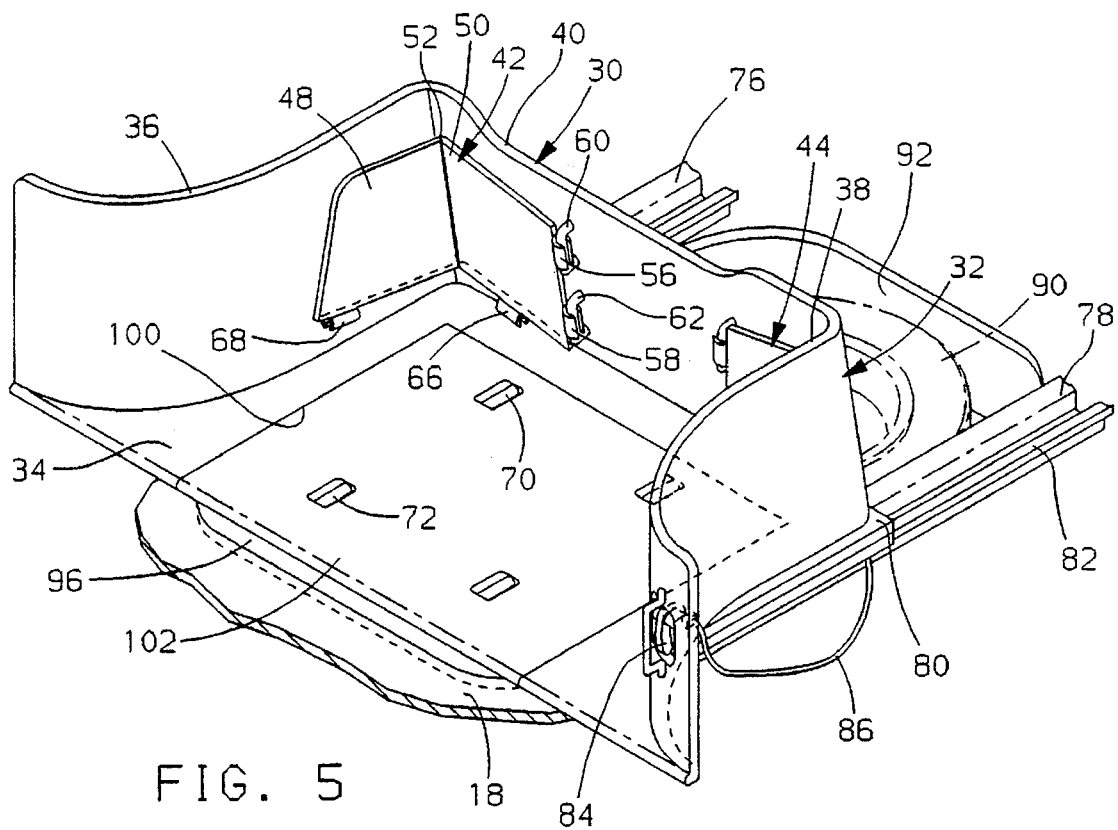
FIG. 5 is a view similar to FIG. 4 but showing the storage device pulled rearwardly to facilitate access to the articles stored in the storage device.

As best seen in FIG. 5, the box 32 is mounted on the vehicle floor 18 by a pair of track assemblies 76 and 78. The track assembly 78 includes an upper track 80 attached to box 32 and lower track 82 attached to the floor 18. These tracks are slidably interconnecting and enable movement of the box 32 from a forwardmost position, shown in FIG. 1, to the rearward most position of FIG. 5 in which the storage box 32 is readily accessible from the rear of the vehicle to enable the placement or removal of groceries or other articles into the storage box 32. The box 32 may be locked in either the forwardmost or rearwardmost position by a lock assembly, not shown, acting between the upper track 80 and lower track 82. The latch assembly is selectively unlatched by operation of a latch handle 84, connected to the latch assembly by a remote cable 86.

Figure 4:
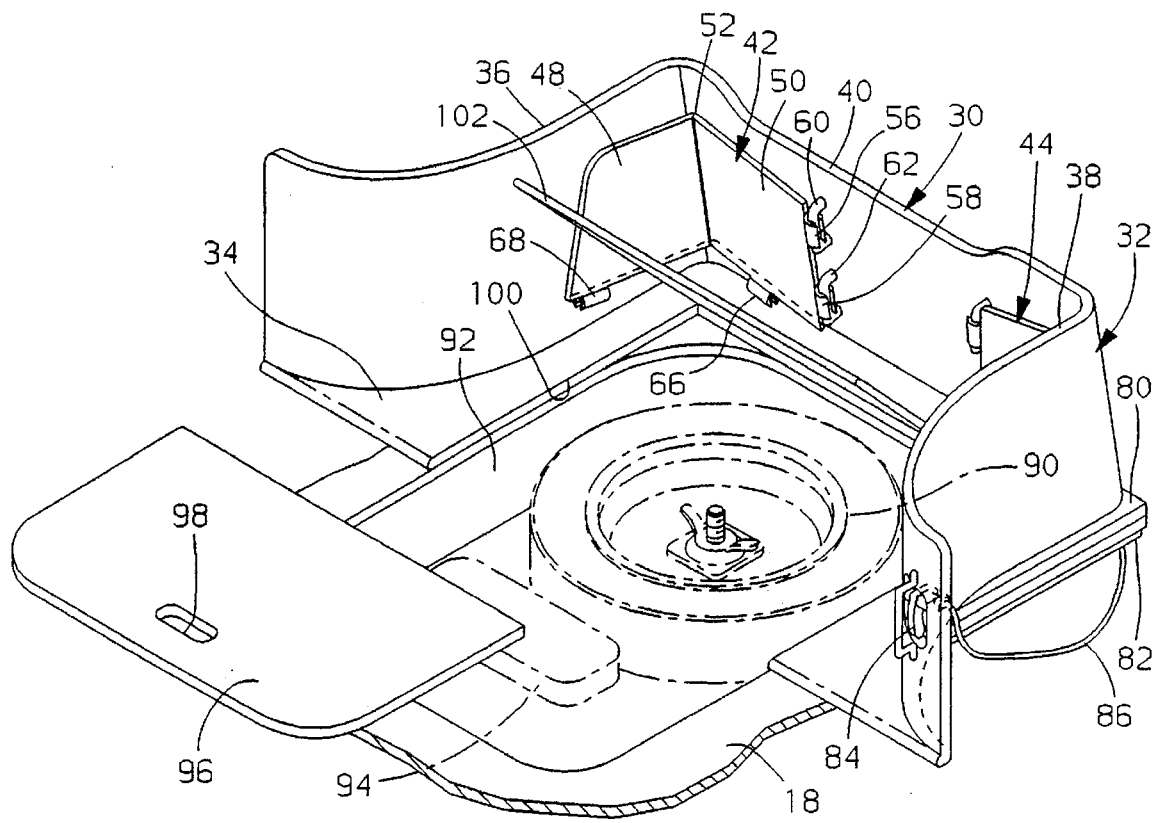
FIG. 4 is a view similar to FIG. 2 but showing the storage device moved full forward in the luggage compartment with the access panel in the floor of the storage box raised and the tire cover ajar to permit access to the spare tire.

As seen in FIGS. 4 and 5, a spare tire 90 is stored within a recess 92 provided in the floor 18 of the vehicle body. The recess 92 also stores a jack 94 and other tools and accessories, as desired. As seen in FIGS. 2 and 4, a rearwardmost portion of the spare tire recess 92 is closed by a spare tire cover 96 which rests on the floor, conceals the recess 92, and has a hand hole 98 to facilitate the removal of the cover 96.

Figure 3:
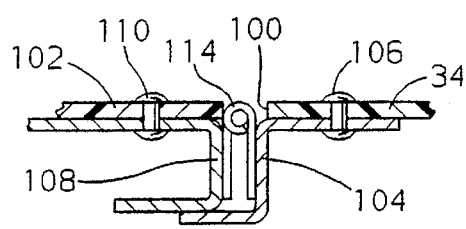
FIG. 3 is a section view taken in the direction of arrows 3—3 of FIG. 2 showing a hinge to hingedly mount an access panel in the floor of the storage device.

As best seen in FIGS. 2 and 4, the floor 34 of the box 32 has a central cut-out opening 100 which is closed by a access panel 102, best seen in FIG. 3. The opening 100 in the floor panel 34 is reinforced by an angle bracket 104 attached to the floor panel 34 by rivets 106. The access panel 102 carries a reinforcement 108 attached thereto by rivets 110. The reinforcement 108 rests on the reinforcement 104 to support the weight of luggage placed upon the access panel 102. A plurality of hinges, one of which is shown at 114, are provided between the reinforcement brackets 104 and 108 to hingedly connect the access panel 102 to the floor panel 34.

As best seen in FIG. 4, access to the spare tire 90 is readily provided by this invention. In particular, FIG. 4 shows the storage device 30 pushed to its forwardmost position. The divider walls 42 and 44 are disconnected from the floor panel 102 and stored away against the vertical walls of the box. The access panel 102 is then raised upwardly as permitted by the hinges 114 to enable access to the spare tire 90. The cover panel 96 is lifted away to provide access to the vehicle jack 94.

It will be apparent that many modifications may be made within the scope of this invention. For example, although hinges are shown for the access panel 102, the hinges can be eliminated and the panel simply lifted away from the opening rather than being pivoted.

Thus, it is seen that the invention provides a new and improved storage device for a vehicle trunk in which a removable access panel provided in the floor of the storage device facilitates access to the spare tire stored beneath the box.

We claim:

1. A storage device for a luggage compartment in a vehicle of the type having a spare tire stowage recess in the floor of the luggage compartment, comprising:

a storage box positioned within the luggage compartment, said box having a horizontal floor panel and a vertical upstanding front and side walls and remaining open at the top and at the rear to enable placement of luggage into the box;

first and second laterally spaced apart slide tracks positioned respectively on opposite sides of the spare tire stowage recess and mounting the box on the floor of the luggage compartment for fore and aft sliding movement;

an opening in the floor panel of the box to allow access to the spare tire stowage recess in the floor of the luggage compartment when the box is slid aft;

and a door panel hingedly mounted on the box to normally close the opening in the floor panel and being hingedly raised to an open position to provide access to the spare tire storage recess when the box is slid aft.

* * * * *